US009692538B2

(12) United States Patent
Tyson et al.

(10) Patent No.: US 9,692,538 B2
(45) Date of Patent: Jun. 27, 2017

(54) LATENCY MITIGATION

(71) Applicant: Qualcomm Technologies International, Ltd., Cambridge (GB)

(72) Inventors: Hugo Mark Tyson, Cambridge (GB); Nicolas Guy Albert Graube, Barrington (GB); Robin Heydon, Cottenham (GB)

(73) Assignee: QUALCOMM Technologies International, LTD., Cambridge (GB)

( * ) Notice: Subject to any disclaimer, the term of this patent is extended or adjusted under 35 U.S.C. 154(b) by 268 days.

(21) Appl. No.: 14/298,237

(22) Filed: Jun. 6, 2014

(65) Prior Publication Data

US 2015/0244484 A1    Aug. 27, 2015

(30) Foreign Application Priority Data

Feb. 25, 2014    (GB) .................................. 1403312.0

(51) Int. Cl.
*H04W 4/00* (2009.01)
*H04L 12/28* (2006.01)
(Continued)

(52) U.S. Cl.
CPC ........ *H04J 3/0661* (2013.01); *H04L 12/2827* (2013.01); *H04W 56/00* (2013.01);
(Continued)

(58) Field of Classification Search
CPC ....... H04W 4/005–4/006; H04W 4/20; H04W 28/021–28/0215; H04W 40/0234;
(Continued)

(56) References Cited

U.S. PATENT DOCUMENTS 6,917,974 B1    7/2005   Stytz et al.
6,986,046 B1    1/2006   Tuvell et al.
(Continued)

FOREIGN PATENT DOCUMENTS

CN    102761941 A    10/2012
CN    102984798 A    3/2013
(Continued)

OTHER PUBLICATIONS

Search Report for DE Application 10 2014 012 258.1 mailed on Mar. 2, 2015 (12 pages).
(Continued)

*Primary Examiner* — Eric Myers
(74) *Attorney, Agent, or Firm* — Paradice and Li LLP

(57) ABSTRACT

A network including a plurality of wireless communication devices capable of operating according to a wireless protocol that imposes no common timebase at the network level, the plurality of devices comprising: an initiator device configured to detect an event and in response transmit an event message having a payload comprising a time field; and a set of appliance devices configured to receive and automatically retransmit messages received from others of the devices, each appliance device being associated with an appliance supplementary to its wireless communication function and being configured to, on receiving an event message comprising a time field, cause their respective associated appliance to perform a function at a time indicated by the content of the time field in the received message.

13 Claims, 2 Drawing Sheets

(51) Int. Cl.
  *H04W 84/18* (2009.01)
  *H04W 28/02* (2009.01)
  *H04W 56/00* (2009.01)
  *H04J 3/06* (2006.01)

(52) U.S. Cl.
  CPC ..... *H04L 2012/2841* (2013.01); *H04W 4/005* (2013.01); *H04W 4/006* (2013.01); *H04W 28/021* (2013.01); *H04W 56/001* (2013.01); *H04W 84/18* (2013.01)

(58) Field of Classification Search
  CPC .......... H04W 56/001–56/002; H04W 56/004–56/005; H04W 84/18–84/22
  See application file for complete search history.

(56) References Cited

U.S. PATENT DOCUMENTS

| | | | |
|---|---|---|---|
| 7,522,540 B1 | 4/2009 | Maufer | |
| 7,778,270 B1 | 8/2010 | Zhang et al. | |
| 7,787,427 B1 | 8/2010 | Simon et al. | |
| 8,495,618 B1 | 7/2013 | Inbaraj et al. | |
| 8,516,269 B1 | 8/2013 | Hamlet et al. | |
| 8,681,671 B1 | 3/2014 | Hui et al. | |
| 8,938,792 B2 | 1/2015 | Koeberl et al. | |
| 8,953,790 B2 | 2/2015 | Qi et al. | |
| 2002/0119770 A1 | 8/2002 | Twitchell, Jr. | |
| 2003/0037237 A1 | 2/2003 | Abgrall et al. | |
| 2003/0163554 A1 | 8/2003 | Sedrowicz | |
| 2003/0181203 A1 | 9/2003 | Cheshire | |
| 2005/0036469 A1 | 2/2005 | Wentink | |
| 2005/0113102 A1 | 5/2005 | Kwon et al. | |
| 2005/0175184 A1 | 8/2005 | Grover et al. | |
| 2005/0246533 A1 | 11/2005 | Gentry | |
| 2005/0249137 A1 | 11/2005 | Todd et al. | |
| 2006/0025180 A1 | 2/2006 | Rajkotia et al. | |
| 2006/0034233 A1 | 2/2006 | Strutt et al. | |
| 2006/0041653 A1 | 2/2006 | Aaron | |
| 2006/0135064 A1 | 6/2006 | Cho et al. | |
| 2006/0154598 A1 | 7/2006 | Rudland et al. | |
| 2006/0156390 A1 | 7/2006 | Baugher | |
| 2006/0209584 A1 | 9/2006 | Devadas et al. | |
| 2006/0212938 A1 | 9/2006 | Suzuki | |
| 2006/0245424 A1 | 11/2006 | Ramanathan et al. | |
| 2006/0268742 A1 | 11/2006 | Chu et al. | |
| 2006/0268749 A1 | 11/2006 | Rahman et al. | |
| 2007/0097895 A1 | 5/2007 | Keshavarzian et al. | |
| 2007/0105542 A1 | 5/2007 | Friedman | |
| 2007/0110024 A1 | 5/2007 | Meier | |
| 2007/0127421 A1 | 6/2007 | d'Amico et al. | |
| 2007/0206537 A1 | 9/2007 | Cam-Winget et al. | |
| 2007/0211654 A1 | 9/2007 | Kim et al. | |
| 2007/0211736 A1 | 9/2007 | Sapek et al. | |
| 2007/0247303 A1 | 10/2007 | Payton | |
| 2007/0280137 A1 | 12/2007 | Bahr et al. | |
| 2008/0013947 A1 | 1/2008 | Peloso et al. | |
| 2008/0095059 A1 | 4/2008 | Chu | |
| 2008/0205385 A1 | 8/2008 | Zeng et al. | |
| 2008/0279155 A1 | 11/2008 | Pratt, Jr. et al. | |
| 2008/0291855 A1 | 11/2008 | Bata et al. | |
| 2008/0292105 A1 | 11/2008 | Wan et al. | |
| 2009/0067373 A1 | 3/2009 | Kneckt et al. | |
| 2009/0216349 A1 | 8/2009 | Kwon et al. | |
| 2009/0222659 A1 | 9/2009 | Miyabayashi et al. | |
| 2009/0232037 A1 | 9/2009 | Dixit et al. | |
| 2009/0274173 A1 | 11/2009 | Wentink | |
| 2010/0005294 A1 | 1/2010 | Kostiainen et al. | |
| 2010/0046439 A1 | 2/2010 | Chen et al. | |
| 2010/0100940 A1 | 4/2010 | Reynolds | |
| 2010/0141406 A1 | 6/2010 | Jo et al. | |
| 2010/0149028 A1 | 6/2010 | Mermet et al. | |
| 2010/0191968 A1 | 7/2010 | Patil et al. | |
| 2010/0202345 A1 | 8/2010 | Jing et al. | |
| 2010/0205281 A1 | 8/2010 | Porter et al. | |
| 2010/0241857 A1 | 9/2010 | Okude et al. | |
| 2010/0246460 A1 | 9/2010 | Kholaif et al. | |
| 2010/0260146 A1 | 10/2010 | Lu | |
| 2010/0262828 A1 | 10/2010 | Brown et al. | |
| 2011/0053493 A1 | 3/2011 | Yanagihara | |
| 2011/0081860 A1 | 4/2011 | Brown et al. | |
| 2011/0099368 A1 | 4/2011 | Koh | |
| 2011/0121654 A1* | 5/2011 | Recker | H02J 9/065 307/66 |
| 2011/0128884 A1 | 6/2011 | Reynaud et al. | |
| 2011/0216695 A1 | 9/2011 | Orth | |
| 2012/0087290 A1 | 4/2012 | Rhee et al. | |
| 2012/0087292 A1 | 4/2012 | Grimm et al. | |
| 2012/0163292 A1 | 6/2012 | Kneckt et al. | |
| 2012/0195231 A1 | 8/2012 | Fonseca et al. | |
| 2012/0196534 A1 | 8/2012 | Kasslin et al. | |
| 2012/0198434 A1 | 8/2012 | Dirstine et al. | |
| 2012/0198435 A1 | 8/2012 | Dirstine et al. | |
| 2012/0252405 A1 | 10/2012 | Lortz et al. | |
| 2012/0263072 A1 | 10/2012 | Wu | |
| 2013/0016654 A1 | 1/2013 | Mayo et al. | |
| 2013/0029685 A1 | 1/2013 | Moshfeghi | |
| 2013/0051552 A1 | 2/2013 | Handschuh et al. | |
| 2013/0064175 A1 | 3/2013 | Pandey et al. | |
| 2013/0065584 A1 | 3/2013 | Lyon et al. | |
| 2013/0067222 A1 | 3/2013 | Munger et al. | |
| 2013/0070745 A1 | 3/2013 | Nixon et al. | |
| 2013/0080765 A1 | 3/2013 | Mohanty et al. | |
| 2013/0128809 A1 | 5/2013 | Wentink et al. | |
| 2013/0130622 A1 | 5/2013 | Yang et al. | |
| 2013/0198305 A1 | 8/2013 | Veillette | |
| 2013/0215900 A1 | 8/2013 | Jogadhenu | |
| 2013/0219482 A1 | 8/2013 | Brandt | |
| 2013/0227336 A1 | 8/2013 | Agarwal et al. | |
| 2013/0242929 A1 | 9/2013 | Goergen et al. | |
| 2013/0279409 A1 | 10/2013 | Dublin, III et al. | |
| 2013/0279410 A1 | 10/2013 | Dublin, III et al. | |
| 2013/0301471 A1 | 11/2013 | Brown et al. | |
| 2014/0025806 A1 | 1/2014 | Robitaille et al. | |
| 2014/0044016 A1 | 2/2014 | Rahman | |
| 2014/0047260 A1 | 2/2014 | Iijima | |
| 2014/0064261 A1 | 3/2014 | Wang et al. | |
| 2014/0089912 A1 | 3/2014 | Wang et al. | |
| 2014/0108786 A1 | 4/2014 | Kreft | |
| 2014/0111234 A1 | 4/2014 | Laackmann et al. | |
| 2014/0112470 A1 | 4/2014 | Shen et al. | |
| 2014/0167912 A1 | 6/2014 | Snyder et al. | |
| 2014/0169174 A1 | 6/2014 | Gilson | |
| 2014/0189790 A1 | 7/2014 | Mindler et al. | |
| 2014/0266669 A1 | 9/2014 | Fadell et al. | |
| 2015/0010153 A1 | 1/2015 | Robertson | |
| 2015/0052351 A1 | 2/2015 | Nodehi et al. | |
| 2015/0143130 A1 | 5/2015 | Ducharme et al. | |
| 2015/0195692 A1* | 7/2015 | Chow | H04M 19/04 455/414.1 |
| 2015/0242614 A1 | 8/2015 | Scagnol et al. | |
| 2015/0244481 A1 | 8/2015 | Tyson et al. | |
| 2015/0244565 A1 | 8/2015 | Heydon et al. | |
| 2015/0244623 A1 | 8/2015 | Heydon et al. | |
| 2015/0244648 A1 | 8/2015 | Tyson et al. | |
| 2015/0244828 A1 | 8/2015 | Heydon | |
| 2015/0245179 A1 | 8/2015 | Jarvis et al. | |
| 2015/0245182 A1 | 8/2015 | Scagnol et al. | |
| 2015/0245203 A1 | 8/2015 | Tyson et al. | |
| 2015/0245204 A1 | 8/2015 | Heydon | |
| 2015/0245220 A1 | 8/2015 | Williamson et al. | |
| 2015/0245231 A1 | 8/2015 | Jarvis et al. | |
| 2015/0245296 A1 | 8/2015 | Tyson et al. | |
| 2015/0245351 A1 | 8/2015 | Banerjea et al. | |
| 2015/0245369 A1 | 8/2015 | Heydon | |
| 2015/0245412 A1 | 8/2015 | Tyson et al. | |
| 2015/0326444 A1 | 11/2015 | Smith et al. | |

FOREIGN PATENT DOCUMENTS

| | | |
|---|---|---|
| EP | 1496668 A1 | 1/2005 |
| EP | 1780951 A2 | 5/2007 |
| EP | 1886450 B1 | 2/2008 |
| EP | 2306692 A1 | 5/2014 |
| GB | 2464125 A | 4/2010 |

(56) References Cited

FOREIGN PATENT DOCUMENTS

| | | | |
|---|---|---|---|
| JP | 2007124148 A | 5/2007 |
| WO | 02078272 A1 | 10/2002 |
| WO | 03026224 A1 | 3/2003 |
| WO | 2004004230 A1 | 1/2004 |
| WO | WO-2004104850 A1 | 12/2004 |
| WO | 2007013914 A1 | 2/2007 |
| WO | 2008013878 A1 | 1/2008 |
| WO | 2008004102 A2 | 5/2008 |
| WO | 2009082151 A2 | 9/2009 |
| WO | 2009088887 A2 | 10/2009 |
| WO | 2010036885 A2 | 4/2010 |
| WO | 2010/089737 A1 | 8/2010 |
| WO | 2011043755 A1 | 4/2011 |
| WO | 2012064178 A1 | 5/2012 |
| WO | 2013010427 A1 | 1/2013 |
| WO | 2013028404 A1 | 2/2013 |
| WO | 2013057666 A1 | 4/2013 |
| WO | 2014/000163 A1 | 1/2014 |

OTHER PUBLICATIONS

Search Report for DE Application 10 2014 012 518.1 mailed on Feb. 27, 2015 (14 pages).
Search Report for DE Application 10 2014 012 615.3 mailed on Jan. 27, 2015 (6 pages).
Search Report for GB Application 1405790.5 mailed on Oct. 14, 2014 (5 pages).
Search Report for GB Application 1501943.3 mailed on Mar. 20, 2015 (4 pages).
Search Report for GB Application 1412722.9 mailed on Jan. 13, 2015 (6 pages).
Search Report for GB Application 1415178.1 mailed on Sep. 25, 2014 (5 pages).
Search Report for GB Application 1405797.0 mailed on Sep. 2, 2014 (3 pages).
Search Report for GB Application 1405789.7 mailed on Sep. 26, 2014 (4 pages).
Search Report for GB Application 1412715.3 mailed on Jan. 8, 2015 (3 pages).
Search Report for GB Application 1415177.3 mailed on Sep. 10, 2014 (4 pages).
Search Report for DE Application 10 2014 012 257.3 mailed on Jan. 27, 2015 (7 pages).
Search Report for DE Application 10 2014 012 616.1 mailed on Feb. 3, 2015 (6 pages).
Search Report for Application No. GB1403312.0 on Jun. 24, 2014, 1 page.
Search Report for Application No. GB1405797.0 mailed on Jul. 17, 2014, 4 pages.
Chiang et al., "Neighborhood-Aware Density Control in Wireless Sensor Networks" published in Sensor Networks, Ubiquitous and Trustworthy Computing, 2008. SUTC '08. IEEE International Conference on, Jun. 11-13, 2008, pp. 122-129, publisher IEEE, Taichung.
Balachandran et al., "Adaptive sleeping and awakening protocol (ASAP)for energy efficient adhoc sensor networks" published in Communications, 2005. ICC 2005. 2005 IEEE International Conference on, May 20, 2005, pp. 1068-1074 (vol. 2), publisher IEEE, Seoul.
Search Report for Application No. GB1403314.6 mailed on Jun. 20, 2014, 4 pages.
Search Report for Application No. GB1405789.7 mailed on Jul. 24, 2014, 4 pages.
Search Report for Application No. GB1403312.0 mailed on Jun. 25, 2014, 3 pages.
Search Report for Application No. GB1405786.3 mailed on Jul. 17, 2014, 3 pages.
Search Report for Application No. GB1405790.5 mailed on Jul. 22, 2014, 4 pages.
Search Report for Application No. GB1413880.4 mailed on Aug. 18, 2014, 7 pages.
Search Report for Application No. GB1405791.3 mailed on Jun. 26, 2014, 3 pages.
Search Report for Application No. GB1405785.5, mailed on Jul. 28, 2014, 4 pages.
Schutz K: "Trusted Platforms for Homeland Security", Atmel white paper, Copyright 2004, pp. 1-8, http://www.atmel.com/images/doc5062.pdf.

* cited by examiner

LATENCY MITIGATION

TECHNICAL FIELD

This invention relates to mitigating the effect of latency in a distributed network.

BACKGROUND OF THE INVENTION

FIG. 1 shows a distributed network. The network comprises a number of devices 1. Each device can communicate wirelessly with the other devices that are in effective range of it. In this example the network is a mesh network. The devices can cooperate to propagate signals (data) between them. For example, if device 1a transmits a signal, that signal can be received by devices 1b and 1c which are within range of device 1a. Devices 1b and 1c can then relay the signal received from device 1a so that it can be received by device 1d which is out of range of device 1a. The coverage area of device 1a is illustrated at 2a and the coverage area of device 1c is illustrated at 2c. This method of communication allows devices to communicate even though they are out of direct range of each other. However, it often has the consequence that, the time taken for the data to propagate from an initiating device to another device can be longer than if the data were conveyed in a single hop. Thus latency may be increased over a network in which data is conveyed in a single hop. Furthermore, when the number of hops needed for the signal to reach its destination is unknown, or may vary depending on propagation conditions or timing considerations, then the latency from the source to the destination may be unpredictable.

One example of a situation in which the latency can be unpredictable arises when the devices do not receive continually. For example, if the devices receive on a ⅓ duty cycle then (ignoring other propagation issues) there is roughly a 33% chance that a packet signal transmitted by one device will be received by another device that is in range. Consequently, in order for a signal to propagate from device 1a to device 1d it may end up going via more than two hops, or there may be retransmissions of the signal at one or more stages in the propagation chain. These effects can increase latency and make it more unpredictable.

It may be that in addition to performing their communication function the devices are cooperating to provide some service. For example, device 1a may be integrated with a light switch 3 and devices 1b and 1d may be integrated with light fittings 4. The signal transmitted by device 1a may signify that the light fittings are to turn on or off. If the light fittings respond to the on/off signal immediately it is received at the respective device then spatially distributed light fittings will turn on or off at slightly different times. If the light fittings are installed along a visually apparent path this may result in an obvious ripple effect as the light fittings change state in turn along that path. If the light fittings are installed over an area then they may give the impression of fading one by one. These effects may be desirable in some environments. However, in other environments it may be desirable for all the light fittings to change state simultaneously so as to mimic the behaviour of light fittings controlled by a traditional wired light switch.

Similar considerations can arise when appliances other than light fittings are associated with the wireless devices.

If the wireless devices operate using a wireless protocol that imposes a common timebase at or below the network layer then that timebase may be used to help synchronise the operation of the associated appliances. However, it may be that the wireless protocol imposes no common timebase at or below the network layer: as, for example in Bluetooth Low Energy. Indeed, it may be desirable for the protocol to impose no common network layer timebase. In order for a wireless communication device to operate with a protocol that uses a network level timebase the device must maintain a local clock. Maintaining an accurate local clock consumes more energy, and so it is desirable to minimise the time when an accurate local clock is active, even if a lower accuracy clock might be running continuously. That is of little concern if the wireless communication device is connected to a mains electric supply, as might be expected if it is associated with a light fitting. However, it may be that the range of the wireless communication devices is insufficient for mains-powered devices to communicate directly with each other. In addition, mains access points may be sparsely distributed, prohibiting direct communication between nodes and thus requiring additional nodes to be deployed that use batteries as power sources. In some environments it may even be desirable for all the nodes to be are battery powered. Mains-powered devices may have to communicate via other low-powered devices that are in the vicinity. Using a protocol that does not impose a common network timebase, or at least an accurate common network timebase, can reduce the power consumed by those devices and make it more likely that signals can be conveyed in an adventitious way between the appliances.

There is a need for a way of synchronising the operation of appliances in a system such as the one described above.

SUMMARY OF THE INVENTION

According to one aspect of the present invention there is provided a network including a plurality of wireless communication devices capable of operating according to a wireless protocol that imposes no common timebase at the network level the plurality of devices comprising: an initiator device configured to detect an event and in response transmit an event message having a payload comprising a time field; and a set of appliance devices configured to receive and automatically retransmit messages received from others of the devices, each appliance device being associated with an appliance supplementary to its wireless communication function and being configured to, on receiving an event message comprising a time field, cause their respective associated appliance to perform a function at a time indicated by the content of the time field in the received message.

Each event message may comprise one or more other data fields and each appliance device may be configured to cause its respective associated appliance to perform a function only if those other fields in the received message meet one or more predefined criteria.

One or more of the appliance devices may comprise a clock, and each of those appliance devices may be configured to, on receiving an event message, perform the steps of: determining a time when it is to retransmit the event message (which may be as soon as possible); form a new time value by subtracting from the time signified by the time field in the received event message the difference as indicated by the clock between the time when that appliance device received the event message and the time when it is to retransmit the event message; and retransmit the event message with its time field signifying the new time value. The step of retransmitting the message may happen promptly after the message has been received. The step of determining the time may comprises determining the time at which that retransmission has been designated to take place.

The clock may be normally stopped and each of those appliance devices may be configured to, on receiving an event message, perform the step of starting the clock.

Those appliance devices may be configured to cause their respective associated appliance to perform a function at a time indicated by the content of the time field in the received message as measured by their respective clock.

One or more of the appliance devices may be configured for reading the time from a clock source external to the respective appliance device, and each of those appliance device may be configured to cause their respective associated appliance to perform a function at a time indicated by the external clock.

Those appliance devices may be configured to access the external clock by receiving wireless signals from the clock.

The devices may be configured to communicate time accessed from an external clock using time differences for adjusting their local time definition.

The wireless communication devices may operate according to the Bluetooth Low Energy protocol.

The initiator device may configured to detect the operation of a user interface device and in response transmit the event message.

The appliances may be lighting appliances.

At least some of the appliance devices may be sited at locations that are out of range of transmissions from the initiator device.

The network may be a mesh network.

The network may be an ad-hoc network.

The network may comprise a set of devices configured to receive and automatically retransmit messages received from other of the devices; each message having a payload comprising a time field; re-transmission of the message being based on previous encounter of message, message content and/or processing of the time field; and According to a second aspect of the present invention there is provided a wireless communication device configured to receive and automatically retransmit messages received from other devices by means of a wireless protocol that imposes no common timebase at the network level, the wireless communication device being associated with an appliance supplementary to its wireless communication function and being configured to, on receiving an event message comprising a time field, cause its respective associated appliance to perform a function at a time indicated by the content of the time field in the received message.

The wireless communication device may be configured to determine whether to retransmit received messages in dependence on one or more of: an indication of a maximum hop count contained in the received message, a determination that the device had received the same message before; and inspection of the time field in the message.

BRIEF DESCRIPTION OF THE DRAWINGS

The present invention will now be described by way of example with reference to the drawings. In the drawings.

DETAILED DESCRIPTION OF THE INVENTION

Figure 1:
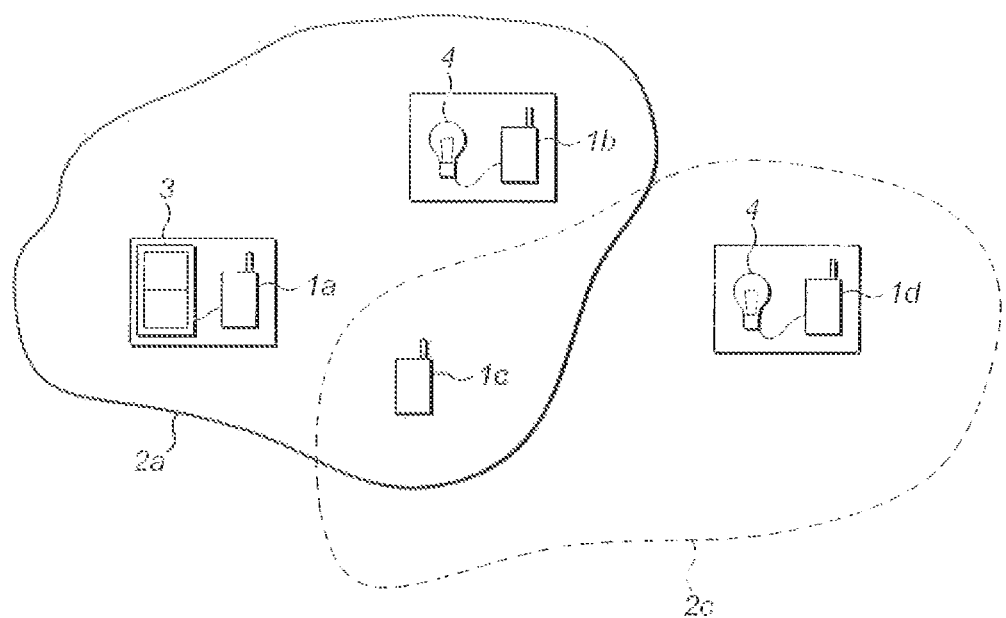
FIG. 1 shows a distributed network.
Figure 2:
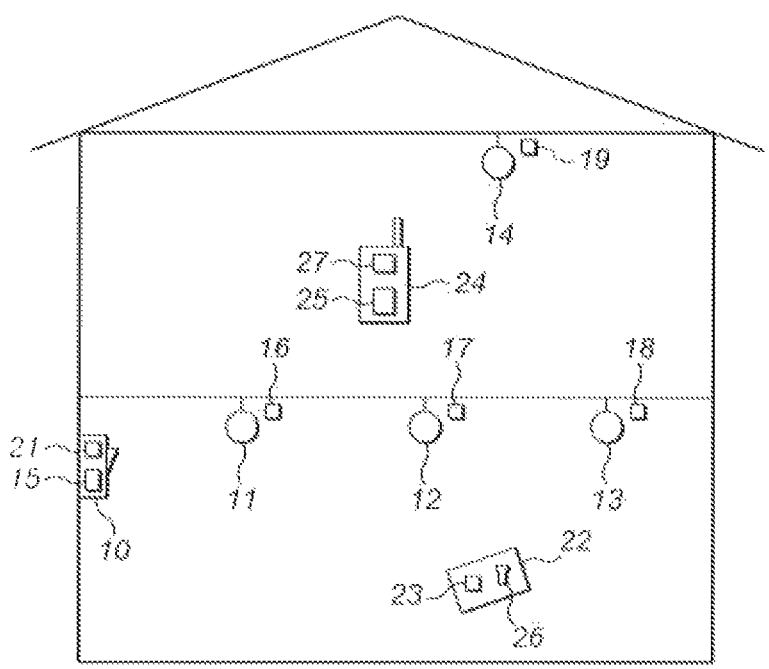
FIG. 2 illustrates a distributed lighting system installed in a house.

FIG. 2 shows a house having a distributed lighting system. The system comprises a light switch unit 10 and light fittings 11, 12, 13, 14. Light switch unit 10 is integrated with a wireless communication device 15. Light fittings 11 to 14 are integrated with respective wireless communication devices 16, 17, 18, 19. The house has a mains electrical supply which powers the light fittings 11 to 14 and their respective wireless communication devices 16 to 19. Light switch unit 10 and its wireless communication device 15 are powered by a local battery 21.

The house contains other items of equipment that contain other wireless communication devices. For example, there is a tablet computer 22 which contains a wireless communication device 23, and a mobile phone 24 which contains a wireless communication device 25. Computer 22 and phone 24 are powered by batteries 26 and 27 respectively.

Wireless communication devices 15 to 19, 23 and 25 operate according to the same wireless communication protocol. That could be a relatively short-range protocol. For example the effective range of each device could be less than 25 m. That characteristic can permit the devices to use less power for transmitting and/or receiving than would be expected in a longer range protocol. The protocol could be one that imposes no common timebase at or below the transport level, or below the application or presentation levels. That characteristic can reduce the devices' power consumption by reducing their for need accurate clocks running continuously. In one example, the devices could operate according to the Bluetooth protocol, specifically the Bluetooth Low Energy protocol. The devices could use other protocols, for instance IEEE 802.11.

Figure 3:
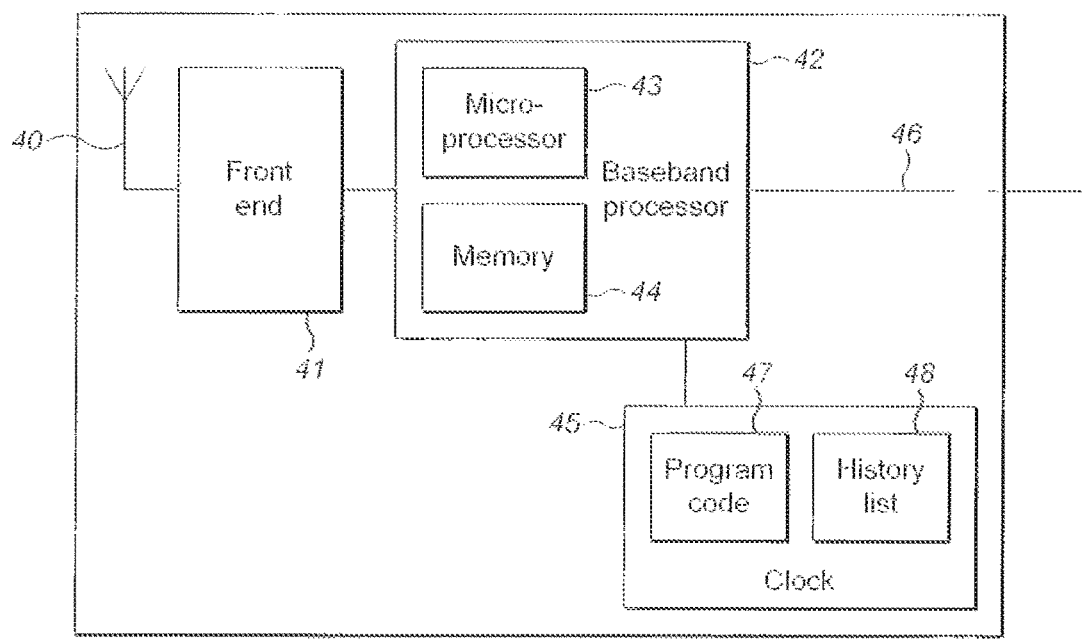
FIG. 3 illustrates a wireless communications device.

FIG. 3 shows the architecture of one of the wireless communication devices. The other wireless communication devices are analogous. The device of FIG. 3 comprises an antenna 40. a radio frequency front end 41 and a baseband processor 42. The baseband processor comprises a microprocessor 43 and a non-volatile memory 44. The non-volatile memory 44 stores in non-transitory form program code 47 that is executable by the microprocessor to cause the baseband processor to implement the communication protocol. The device also comprises a clock 45, which can be turned on or off by the microprocessor 43 in order to save power, and an external wired connection 46 for sensing external events (e.g. the operation of an associated user interface device such as a switch) or issuing control signals to associated appliances (e.g. light fittings).

The RF front end 41 and the baseband processor could be implemented on one or more integrated circuits.

Devices 15 to 19 are configured cooperatively in order that the light fittings 11 to 14 know to respond to signals from the light switch 10. This may be done by the devices 15 to 19 storing a common identification code in their respective non-volatile memories. The identification code may be stored in the light switch when it is manufactured, and stored in the light fittings at the time they are installed in the house. They may be stored in the light fittings by means of another device such as mobile phone 24 communicating with the wireless device of the light switch to read its identification code, and then communicating with the wireless devices of the light fittings to cause them to store that same identification code.

The process by which a signal is passed from the light switch to the light fittings will now be described.

The light switch is connected by a wired link to its local wireless communication device 11. When a user operates the light switch that fact is signalled to the baseband processor of device 11 over that wired link. The baseband processor responds to that signal by transmitting a wireless switching signal using its wireless protocol. The switching signal comprises a data payload of the following form:

[SWITCH ID, COMMAND, TIME FIELD, EVENT ID]

where:
SWITCH ID is the identification code of the switch, which could be a long number and is unique to that switch.
COMMAND is an instruction to the target device. For instance, it may signify whether the switch is being turned on or off, or a colour change, or any operations applicable to lighting or whatever other appliance may be being used.
TIME FIELD is a field carrying timing data whose significance will be described in detail below.
EVENT ID is a field indicating the serial number of the event from the switch. This value is stored in the non-volatile memory of device 11 and incremented each time the switch is operated. The combination of SWITCH ID and EVENT ID allows the event indicated by the message to be uniquely identified.

Any devices that are in range of device 11 may receive the switching signal. When another device receives the switching signal it performs the following functions:
1. It establishes whether it should relay the signal, and if so it relays the signal.
2. It establishes whether the signal is one on which its associated appliance is intended to act, and if so it controls the appliance accordingly.

Each stores in its non-volatile memory a history list 48 containing, for each recent switching signal if received, of the SWITCH ID and EVENT ID of that signal. The list could, for example, contain entries corresponding to the 1024 most recently received signals. To perform step 1 the device that received the signal checks whether any single entry in the list contains the SWITCH ID and EVENT ID of the newly received signal. If an entry does contain that pair of IDs then that signifies that the device is already aware of the switching event corresponding to that signal, in that case it does not relay the signal. Otherwise it adds the SWITCH ID and EVENT ID of the newly received signal to the list (in doing so it may remove the oldest entry from the list) and then relays the switching signal. To relay the switching signal it transmits itself another switching signal whose payload contains the same SWITCH ID, COMMAND and EVENT ID as the recently received signal. The content of the TIME FIELD of the re-transmitted signal will be described below. A device may also decide whether to retransmit a message in dependence on the TIME FIELD. For instance, if the TIME FIELD is to express a target time and the device can establish that time has expired, re-transmission can be omitted.

The payload may contain a HOP COUNT field which indicates the remaining number of hops over which the message may be retransmitted. When the switching message is initiated the HOP COUNT can be set to a number that is appropriate to the network where it is being used, for example 10 or 30. Then each time a device receives a switching message and determines to retransmit it that device can decrement the HOP COUNT value (e.g. by one) and use the decremented hop count value in each message it retransmits. Then when a device receives a switching message with a HOP COUNT of zero it can determine not to retransmit the message, in that way the HOP COUNT field can help to avoid flooding of the network.

To perform step 2 the device compares the SWITCH ID contained in the received signal with the identification code stored in its non-volatile memory. If the received SWITCH ID matches the stored identification code then the received signal is one on which the associated appliance is intended to act. If the two do not match then the received signal is not one on which the associated appliance is intended to act. If the appliance is intended to act on the signal then the baseband processor of the device implements that action in a way that will be described below. Step 2 could be omitted if in step 1 it is determined that the device matches the SWITCH ID and EVENT ID in its history list, since then the device will already have determined to action the switching signal.

The result of this is that the switching signal transmitted by the device 11 associated with the light switch will be propagated by the devices that are in range of device 11. In the example of FIG. 2 that is only devices 16 and 25. Those devices retransmit the signal to devices in range of them. In the example of FIG. 2 that is device 19, which is in range of device 25 and devices 17 and 23, which are in range of device 17. Then devices 19, 17 and 23 perform the same set of steps, resulting in the signal being transmitted to device 18, which is in range of device 23. When device 17 retransmits the switching signal its retransmission will be received by device 16. However, the signal then received by device 16 will contain a SWITCH ID and EVENT ID that are in the history list of device 16, so device 16 will not retransmit the signal. The use of the history list thus prevents the network being flooded with redundant packets.

It may be that the devices are active to receive for only part of the time, in order to save power, if that is the case then a device that transmits a signal may retransmit that signal a number of times, at appropriate intervals, to achieve a high probability that all nearby devices will receive the signal even though they only receive intermittently. Having a device relay the signal multiple times may be desirable in other situations too.

The way in which the devices cause their associated appliances to action the signals will now be described.

In a first example of the use of the TIME FIELD, the TIME FIELD signifies a delay from when the signal containing the TIME FIELD was transmitted to the time when the switching signal is to be actioned by appliances. Each time the switching signal is retransmitted by a device the baseband processor of that device re-computes the TIME FIELD to be included in the signal it transmits, so that it signifies the same time for the signal to be actioned as in the received signal that gave rise to the retransmission. When a signal is received by a relaying device the baseband processor of that relaying device either observes the time indicated by its local clock or, if its local clock was previously turned off, it starts its local clock running. Then at the point when the baseband processor of the relaying device comes to relay the switching signal it notes the time given by its local clock, determines the interval since it received the corresponding signal, reduces the TIME FIELD value in the corresponding signal as received by the determined interval, and uses that reduced time field value in the signal it relays. In an alternative mechanism the delay between reception and transmission could be known—for example if it is dictated by the device architecture or the timing constraints of the protocol in question. In that case the retransmitting device need not use a clock to re-compute the TIME FIELD: it could simply subtract a predetermined value from the TIME FIELD of the signal as received in order to form the TIME FIELD for retransmission. The predetermined value in that case represents a predetermined estimate of the fixed time between reception and transmission.

For example, the TIME FIELD may signify a time in milliseconds. The first switching signal sent by the device 11 associated with switch 10 may have a time field of 5000, signifying that the switching event commanded by the signal is to take place 5 seconds after the first switching signal was transmitted. That signal may be received by device 12, whose baseband processor then starts its focal clock running. At some later time the baseband processor of device 12 is about to relay the switching signal received from device 11. It observes that the value of its local clock indicates a time of 435 ms. It reduces the TIME FIELD value of 5000 in the signal as received by the delay of 435 ms to give a new TIME FIELD value of 4565, and it includes that value as the TIME FIELD in the payload of its relayed signal.

When other devices relay signals they behave similarly. In this way, the device can all estimate a common time to the designated switching time without them having to maintain a common timebase when a switching operation is not in progress.

When a device has to transmit more than once the signal it is relaying, for example to increase the probability of it being received by another device, it re-computes the TIME FIELD each time it transmits the signal. The object is that each time the switching signal is transmitted (including when it is retransmitted) the TIME FIELD represents the interval between the time of transmission and a set point in time when the switching action is to be implemented.

When the baseband processor of a device identifies that a switching signal is intended to be actioned by its associated appliance (see step 2 described above) it waits until the time designated in the TIME FIELD of a signal as received has elapsed since the signal was received. At that point it signals its associated appliance to turn on or off as designated by the COMMAND field in the received signal.

The baseband processor of a device that received the switching signal can turn off its local clock (if it is not needed for any other purpose):
(a) if the signal is not to be actioned by an appliance local to that device, when it has finished relaying the signal (with any retransmissions); or
(b) if the signal is to be actioned by an appliance local to that device, when it has signalled the local appliance to action the signal.

In a second example of the use of the TIME FIELD, the TIME FIELD signifies a time in a commonly accessible timebase at which the switching signal is to be actioned by appliances. That timebase could be a timebase held in or local to the wireless devices, for example if they each have or have access to a continually running clock. Alternatively it could be a timebase defined by a broadcast signal that can be received by all the devices, such as a time signal transmitted at a higher power than the signals transmitted by the wireless devices themselves. In this example, the TIME FIELD could signify a time of day, for instance 10:24 and 3,546 seconds. In this example the TIME FIELD is forwarded unmodified by each device. When the switching signal comes to be actioned by the baseband processor of one of the devices, the baseband processor actions the signal when it determines that the time indicated by the TIME FIELD has been reached. To implement this example the baseband processor may have access to data from another wired or wireless protocol. For example, the timebase against which the time signified by the TIME FIELD is assessed could be received from the internet using network time protocol (NTP), from a satellite positioning protocol such as GPS, Galileo, or from a ground-based wireless broadcast signal such as a digital television (DTV) signal or a longwave/shortwave time reference such as MSF. The timebase could be distributed between the application layers of the devices by signals transmitted wirelessly between the devices. Alternatively, the timebase can also be transmitted via node re-transmission, using an approach akin to the TIME FIELD re-computation exposed in first example.

In an alternative embodiment a mechanism similar to that described above can be used, but with a coarse common time reference being maintained over multiple devices by some or all of those devices periodically transmitting their local opinions of the value of that coarse common time reference (CCTR).

The CCTR might be a 32-bit approximately-microsecond value which wraps around every 1 hour 11 minutes, or a millisecond counter, or similar. The CCTR is not used by at the network layer or below for synchronisation of the transport protocol, only for short-term synch of devices.

An update protocol could involve a device A transmits an indication of its estimate of the CCTR. When that transmission is received by a device B, device 8 may compare the received CCTR indication with its local CCTR estimate, and may adjust its local value in some manner to bring it closer to the received value. For example, B may adjust its local CCTR value by a small amount towards the received value. As multiple devices share their CCTR values a consensus CCTR will be established between the devices even though individual clocks may drift differently over time.

The devices may be configured not to forward the CCTR-carrying messages. This may be done by setting the TIME FIELD value of the CCTR messages to zero.

Traffic can be limited by setting a predetermined maximum frequency at which a device can send CCTR update messages. Alternatively the original CCTR value could be used as a UID and send along with the modified value when such a message is forwarded.

It may turn out that the CCTR rate though nominally at a level of, for instance, microseconds might deviate from UTC by some amount. However, it will be common to the devices in a particular mesh, so good enough to synchronise devices to all turn on their associated appliances at once.

If all stations possess a CCTR the TIME VALUE field a can refer to a certain CCTR value.

In all the above examples the signal is actioned at a time signified by the TIME FIELD.

The payload may include other data. The payload may be encrypted, in which case the devices receiving it may decrypt it to read it, and re-encrypt any payloads they wish to transmit.

Instead of responding to a switch, the initiating device could respond to another user interface device such as a touch screen, or to a sensor such as a proximity sensor, temperature sensor, motion sensor etc.

The system described above can be used with appliances other than light switches and/or lighting appliances. For example, the instrument that initiates the signalling could be an alarm controller and the appliances that action the signal could be alarm sounders. In another example the instrument that initiates the signalling could be a signage controller and the appliances that action the signal could be signs. The signals' payloads could contain additional data representing information to be displayed on the signs. In another example the instrument that initiates the signal could be an authenticator such as a card reader, keypad or biometric reader and the appliances that action the signal could be locks. The messages referred to above as switching messages may be considered more generically to foe event messages.

The devices that first transmit and relay the switching signals can be pre-configured to cooperate with each other for retransmission. Alternatively they could be configured by default to relay signals of the type described above. Hence the devices could form an ad-hoc network.

The devices could form a mesh network. The devices could be configured to forward some or all messages they receive. The devices could be configured to forward only messages received from some other devices. That can help to avoid excessive network traffic and/or power consumption. All the devices could be peers in that they have identical roles at a network level.

In one example the system described above can be used to arrange that light units are switched on or off at the same time by a switch, when the switch and the light units are equipped with Bluetooth Low Energy devices configured to operate as a mesh network.

The operations described above for the baseband processor could be carried out by other devices. For example, there could be a dedicated processor for implementing the protocol described above, or some of the operations could be carried out by the baseband processor and some by another processing entity.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method for communicating with one or more wireless communication devices operating according to a wireless protocol, the method comprising:
   receiving an event message comprising a time field at an appliance device of the one or more wireless communication devices, the appliance device being associated with an appliance;
   in response to receiving the event message, start a local timer of the appliance device;
   determining whether the event message needs to be retransmitted;
   based on the determination that the event message needs to be retransmitted:
     updating the time field of the event message, comprising:
       using the local timer to determine a time value for updating the time field of the event message; and
       modifying a value of the time field of the event message by the determined time value; and
     retransmitting the updated event message;
   evaluating whether the appliance associated with the appliance device needs to perform a function based on the event message; and
   based on the evaluation, causing the appliance to perform the function at a target time based on the time field of the event message;
   wherein the wireless protocol excludes a common time-base at the network level.

2. The method of claim 1, wherein the event message comprises one or more data fields and the evaluation is based on the one or more data fields.

3. The method of claim 1, wherein the wireless protocol is a Bluetooth Low Energy protocol.

4. The method of claim 1, wherein the time field signifies a delay between a time when the event message was transmitted and a time when, at least one from the group consisting of the appliance and a target appliance associated with the one or more wireless communication devices, needs to perform the function.

5. The method of claim 1, the method further comprising:
   in response to receiving the event message, starting a local timer of the appliance device;
   using the local timer to determine the target time based on the time field of the event message; and
   resetting the local timer after the appliance performs the function.

6. An appliance device, the appliance device being associated with an appliance, and comprising:
   one or more processors;
   a memory storing instructions that, when executed by the one or more processors, cause the appliance device to:
     receive an event message comprising a time field from one or more wireless communication devices;
     in response to receiving the event message, start a local timer of the appliance device;
     determine whether the event message needs to be retransmitted;
     based on the determination that the event message needs to be retransmitted:
       updating the time field of the event message, comprising:
         using the local timer to determine a time value for updating the time field of the event message; and
         modifying a value of the time field of the event message by the determined time value; and
       retransmitting the updated event message;
     evaluating whether the appliance associated with the appliance device needs to perform a function based on the event message; and
     based on the evaluation, causing the appliance to perform the function at a target time based on the time field of the event message;
     wherein the one or more wireless communication devices and the appliance device operate according to a wireless protocol that excludes a common time-base at the network level.

7. The appliance device of claim 6, wherein the event message comprises one or more data fields and the evaluation is based on the one or more data fields.

8. The appliance device of claim 6, wherein the one or more wireless communication devices and the appliance device operate according to a Bluetooth Low Energy protocol.

9. The appliance device of claim 6, wherein the time field signifies a delay between a time when the event message was transmitted and a time when, at least one from the group consisting of the appliance and a target appliance associated with the one or more wireless communication devices, needs to perform the function.

10. The appliance device of claim 6, wherein the appliance device and the one or more wireless communication devices are in a mesh network.

11. The appliance device of claim 6, wherein execution of the instructions further causes the appliance device to: in response to receiving the event message, start a local timer of the appliance device; use the local timer to determine the target time based on the time field of the event message; and reset the local timer after the appliance performs the function.

12. A non-transitory computer-readable storage medium storing instructions that, when executed by a processor of an appliance device, the appliance device being associated with an appliance, causes the appliance to:

receive an event message comprising a time field from one or more wireless communication devices;

in response to receiving the event message, start a local timer of the appliance device;

determine whether the event message needs to be retransmitted;

based on the determination that the event message needs to be retransmitted:
updating the time field of the event message, comprising:
using the local timer to determine a time value for updating the time field of the event message; and
modifying a value of the time field of the event message by the determined time value; and
retransmitting the updated event message;

evaluating whether the appliance associated with the appliance device needs to perform a function based on the event message; and based on the evaluation, causing the appliance to perform the function at a target time based on the time field of the event message;

wherein the one or more wireless communication devices and the appliance device operate according to a wireless protocol that excludes a common timebase at the network level.

13. The non-transitory computer-readable medium of claim 12, wherein execution of the instructions further causes the appliance device to: in response to receiving the event message, start a local timer of the appliance device; use the local timer to determine the target time based on the time field of the event message; and reset the local timer after the appliance performs the function.

* * * * *